United States Patent
McIntyre

(10) Patent No.: US 6,421,138 B1
(45) Date of Patent: Jul. 16, 2002

(54) PAGE ALLOCATION/DEALLOCATION PROCEDURE FOR A PRINTER/COPIER WITH ACCESSORY MEDIA SHEET HANDLING APPARATUS

(75) Inventor: C. Kevin McIntyre, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/388,185

(22) Filed: Sep. 1, 1999

(51) Int. Cl.[7] ............................................. G06K 15/00
(52) U.S. Cl. ..................... 358/1.16; 358/1.12
(58) Field of Search ................... 358/1.1, 1.12, 358/1.16, 1.13, 498, 403, 404; 399/16, 9, 19, 21, 22, 381, 393, 397, 389; 271/303, 278

(56) References Cited

U.S. PATENT DOCUMENTS

| | | | |
|---|---|---|---|
| 5,075,782 A | 12/1991 | Tufano et al. | 358/437 |
| 5,148,284 A | 9/1992 | Nishikawa et al. | 358/296 |
| 5,210,823 A | 5/1993 | Moroi | 395/116 |
| 5,413,419 A | 5/1995 | Oami et al. | 400/61 |
| 5,664,074 A | 9/1997 | Kageyama et al. | 395/113 |
| 5,680,522 A | 10/1997 | Kasai | 395/113 |
| 5,771,103 A | 6/1998 | Ogino | 358/437 |
| 5,923,942 A | * 7/1999 | Nuggehalli et al. | 399/389 |
| 6,075,617 A | * 6/2000 | Fischer et al. | 358/1.13 |

* cited by examiner

Primary Examiner—Arthur G. Evans

(57) ABSTRACT

The invention assures that page data in a printer/copier memory is retained until the corresponding page is successfully output to an attached page handling accessory. The system incorporating the invention includes a memory with storage regions allocated to store page data to be printed, a print engine that is responsive to the page data to output printed pages, and an output tray for receiving printed pages from the print engine and for providing a first signal indicative of such receipt. A page handling accessory is coupled to the output tray for further processing of the printed pages and is constructed to provide a second signal that is indicative of a page output therefrom after its handling actions are completed. A processor is controlled by a page management process to deallocate storage areas allocated to a page upon receipt of both the first signal and the second signal, indicating that the page has successfully exited from the page handling accessory.

8 Claims, 3 Drawing Sheets

PAGE ALLOCATION/DEALLOCATION PROCEDURE FOR A PRINTER/COPIER WITH ACCESSORY MEDIA SHEET HANDLING APPARATUS

FIELD OF THE INVENTION

This invention relates to a method and apparatus for determining when a memory allocation for a page in a printer or a copier should be discontinued and, more particularly, to such a method and apparatus that only deallocates memory for a page when that page has been output from a page handling accessory to the ultimate user.

BACKGROUND OF THE INVENTION

Currently, printers and copiers, after a page has been printed and sent to an output bin, deallocate memory set aside for the page. Such memory allocation/deallocation is accomplished by a page management process. Once the page is sent to the output bin, it is considered as having been successfully printed by the page management process. So long as the output bin comprises a portion of the native printer/copier, it is assured that a page ejection signal issuing from the output bin indicates successful output of the page.

However, some customers attach third party media sheet handling apparatus to printer/copiers to perform additional functions with respect to the print job that includes the page. For instance, such functions may include stapling, embossing, binding, etc. If a jam or other error occurs at the page-handling accessory, no methodology exits to inform the page management process of the jam or error and, further, to enable a reprint of the print job from a given page number.

For example, if a printer/copier is working on page 6 of seven-page job, the page-handling accessory may include a complicated path that causes it to be working on page 2 when it incurs an error or a jam. Under such circumstances, it is desirable that the page handling accessory device have the ability to inform the printer/copier to flush its page buffer and to restart printing from page 2.

The prior art includes a number of teachings with respect to responding to a paper jam or other printer/copier page movement problem. For instance, U.S. Pat. No. 5,680,522 to Kasai describes a printer system that responds to a paper jam by causing the bit map data of the jammed page, that is kept in the page buffer, to be sent again to a receiving buffer so that it can be reproduced. U.S. Pat. No. 5,413,419 to Oami et al. describes a paper jam recovery procedure wherein page data is accessed from either a first buffer memory or a second memory which includes raster image data, depending upon the particular page that has caused the jam. A similar jam recovery system is disclosed in U.S. Pat. No. 5,210,823 to Moroi. More specifically, a printing control apparatus recovers a jammed page by using the page intermediate descriptors stored in a page descriptor area of memory. In the case where the print data has been saved to a separate area, that print data is used. Further, in a case where the print data includes a substantial amount of image information, raster image information that has been saved in a bit map memory is utilized.

While the above-indicated prior art describe a variety of methods for recovering print data for a jammed page, it does not take into account the problem that arises when the printer/copier believes that it has successfully ejected a page to the output bin but apparatus which post processes the page creates the jam action.

Accordingly, there is a need for a page recovery action that can respond to recover a page in the event that a jam occurs in a page handling accessory that is not part of the native printing/copying device.

SUMMARY OF THE INVENTION

The invention assures that page data in a printer/copier memory is retained until the corresponding page is successfully output to an attached page handling accessory. The system incorporating the invention includes a memory with storage regions allocated to store page data to be printed, a print engine that is responsive to the page data to output printed pages, and an output tray for receiving printed pages from the print engine and for providing a first signal indicative of such receipt. A paper handling accessory is coupled to the output tray for further processing of the printed pages and is constructed to provide a second signal that is indicative of a page output therefrom after its handling actions are completed. A processor is controlled by a page management process to deallocate storage areas allocated to a page upon receipt of both the first signal and the second signal, indicating that the page has successfully exited from the page handling accessory.

DETAILED DESCRIPTION OF THE INVENTION

Figure 1:
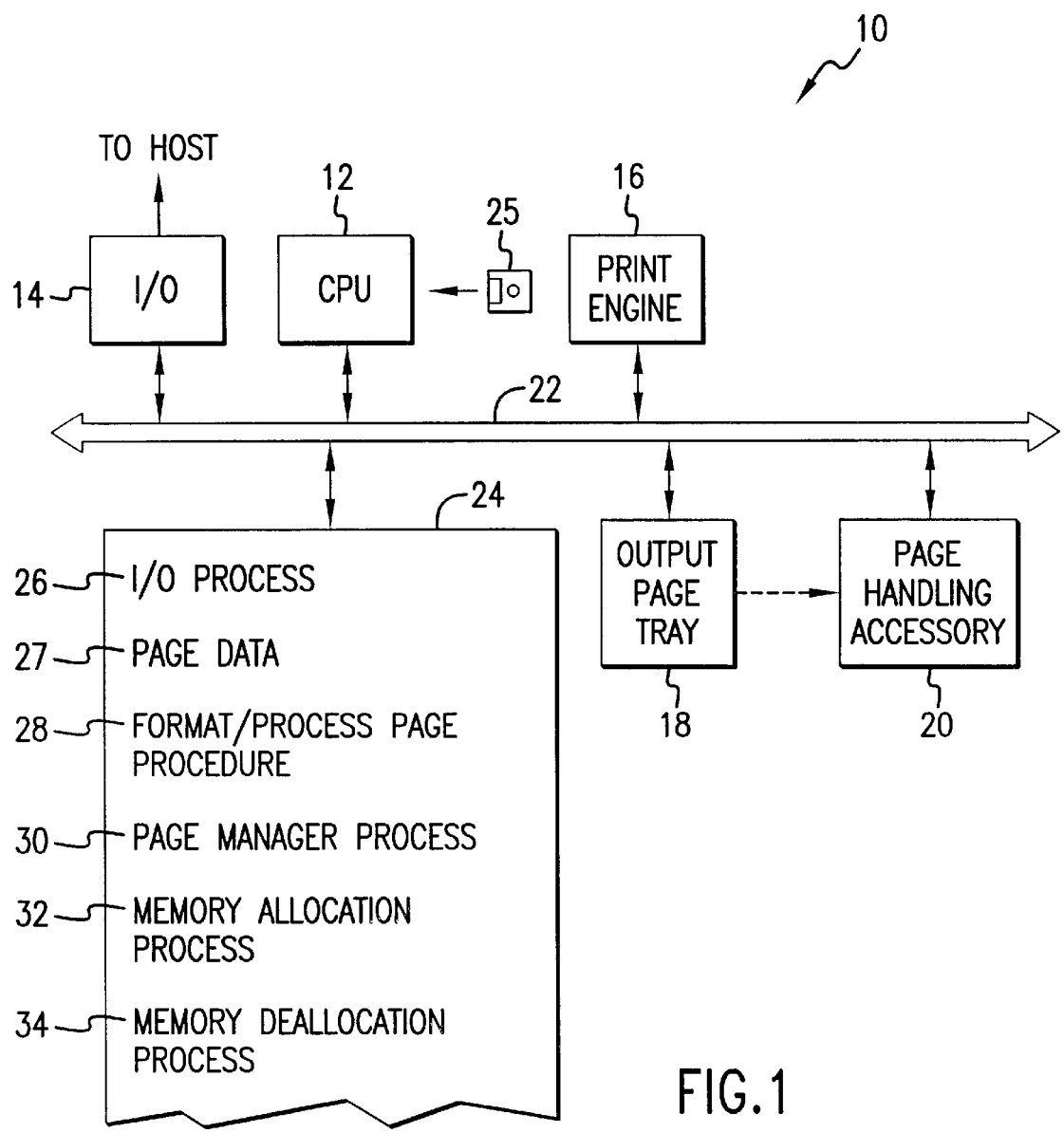
FIG. 1 is a high level block diagram of a system for performing the invention.

Referring first to FIG. 1, a printer system 10 is illustrated for performing the invention. It is to be understood, however, that a copier or other image-producing facility which outputs pages is also contemplated within the bounds of the invention.

Printer 10 includes a central processing unit (CPU) 12 that controls the overall operation of the printing system. An input/output module (I/O) 14 provides an input portal for print data from a host processor. A print engine 16 provides the image producing capability for printer 10 and further includes media handling apparatus for moving media from a paper supply to an output paper tray 18. A paper handling accessory 20 is mechanically coupled to output paper tray 18 and further is electrically coupled to a bus system 22 which provides a communication pathway between the elements of printer 10.

A memory 24 (which may include both random access memory and read-only memory) incorporates the processes that are used to control printing system 10 in conjunction with CPU 12. An (I/O) process 26 controls the receipt of print data from I/O module 14 and its storage into page data region 27. A format/page process 28 enables conversion of the received page data into both page intermediate and raster image data that is capable of being printed by print engine 16. A page manager process 30 provides overall control of the page handling actions of printer 10, while memory allocation process 32 and memory deallocation process 34 operate in conjunction therewith to both allocate and de-allocate memory as pages are input/output from the page processing action.

In brief, each page has a section of memory allocated to it by memory allocation process 32 as it is being processed. Once the page has been successfully output, memory deallocation process 34 returns the previously allocated memory to a memory pool so as to make it available for subsequent allocation to a next page.

Note that while all of the procedures to operate the invention will be described as already loaded into memory 24, such procedures may be stored on a memory device 25 and loaded into memory 24 on an as-needed basis.

Figure 2:
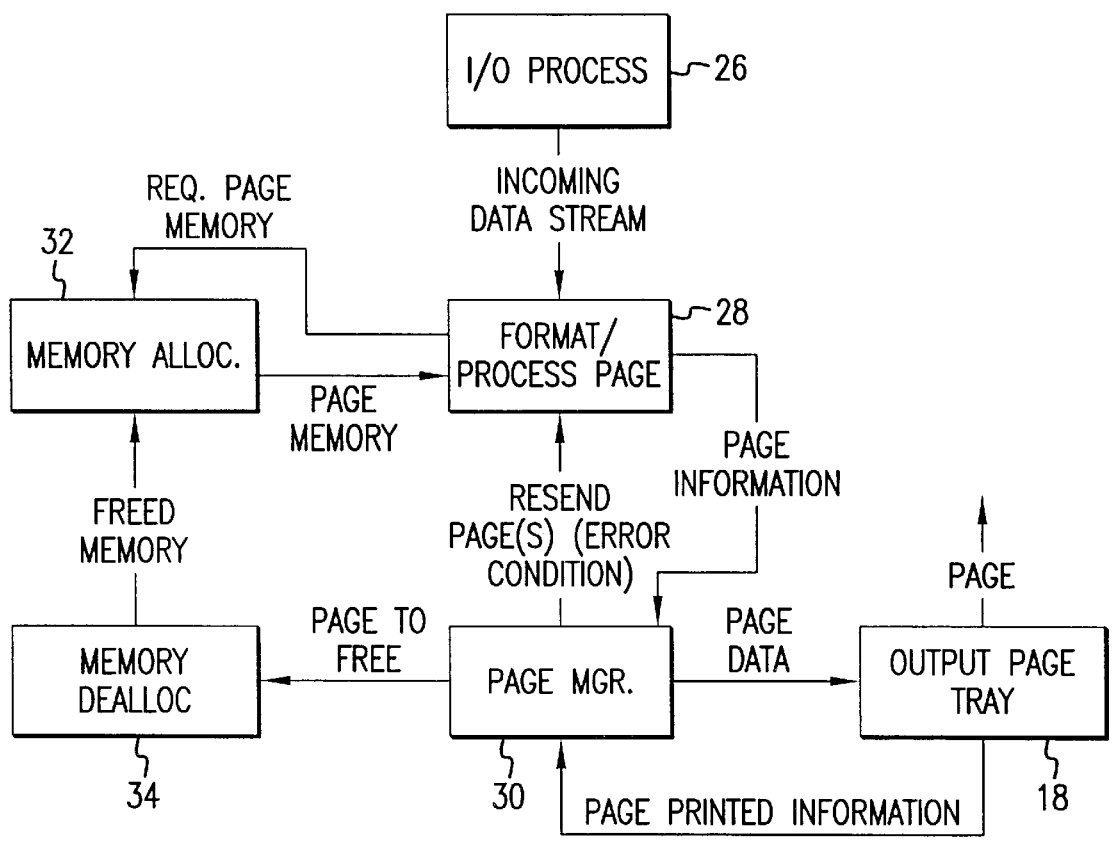
FIG. 2 is a process flow diagram illustrating a prior art method for recovery in the event of a page jam.

Turning to FIG. 2, the procedure employed by printer 10 to recover from page jams will be described when no page handling accessory 20 is present (as in the prior art). I/O process 26 receives data from I/O module 14 and passes responsibility for the incoming data stream to format/process page procedure 28. This procedure takes the incoming data and requests storage space from memory allocation process 32 for storage of both formatted page data and raster binary page data for printing. Memory allocation process 32 provides such allocation to format/process page procedure 28, which then proceeds to convert the page description language into binary raster data.

Once a page is rasterized, information about the page, along with the rasterized data is sent to page manager process 30 which handles distribution of the page, duplexing thereof, page path control, etc., all internal to printer 10.

If the page is ready to be printed, print engine 16 is started and the page is printed and ejected to output page tray 18. If, during any portion of the printing action, a paper jam or other error occurs, the page that experiences the error, along with any other pages in the page pipe line (i.e., pages that have been dispatched, but not printed) are resent. Page manager process 30 does not release storage for any page until the respective page has been successfully printed and output to page tray 18. In turn, page tray 18 signals that a page ejection has occurred, allowing release of the allocated memory for the page.

Page manager process 30 keeps track of (i) the last known successful page printed, (ii) the last page ejected to output page tray 18 and (iii) the remaining pages in the pipeline. Once the page is printed and output page tray 18 indicates its successful ejection thereinto, page manager process 30 causes memory deallocation procedure 34 to deallocate the memory and returns it to the memory pool for use with subsequent pages.

With the above-indicated prior art procedure, a problem occurs if printer 10 includes page handling accessory 20 and it experiences some type of malfunction, causing a page not to be output. In such case, page manager process 30 had no way of knowing of the malfunction nor of recovering from the malfunction.

Figure 3:
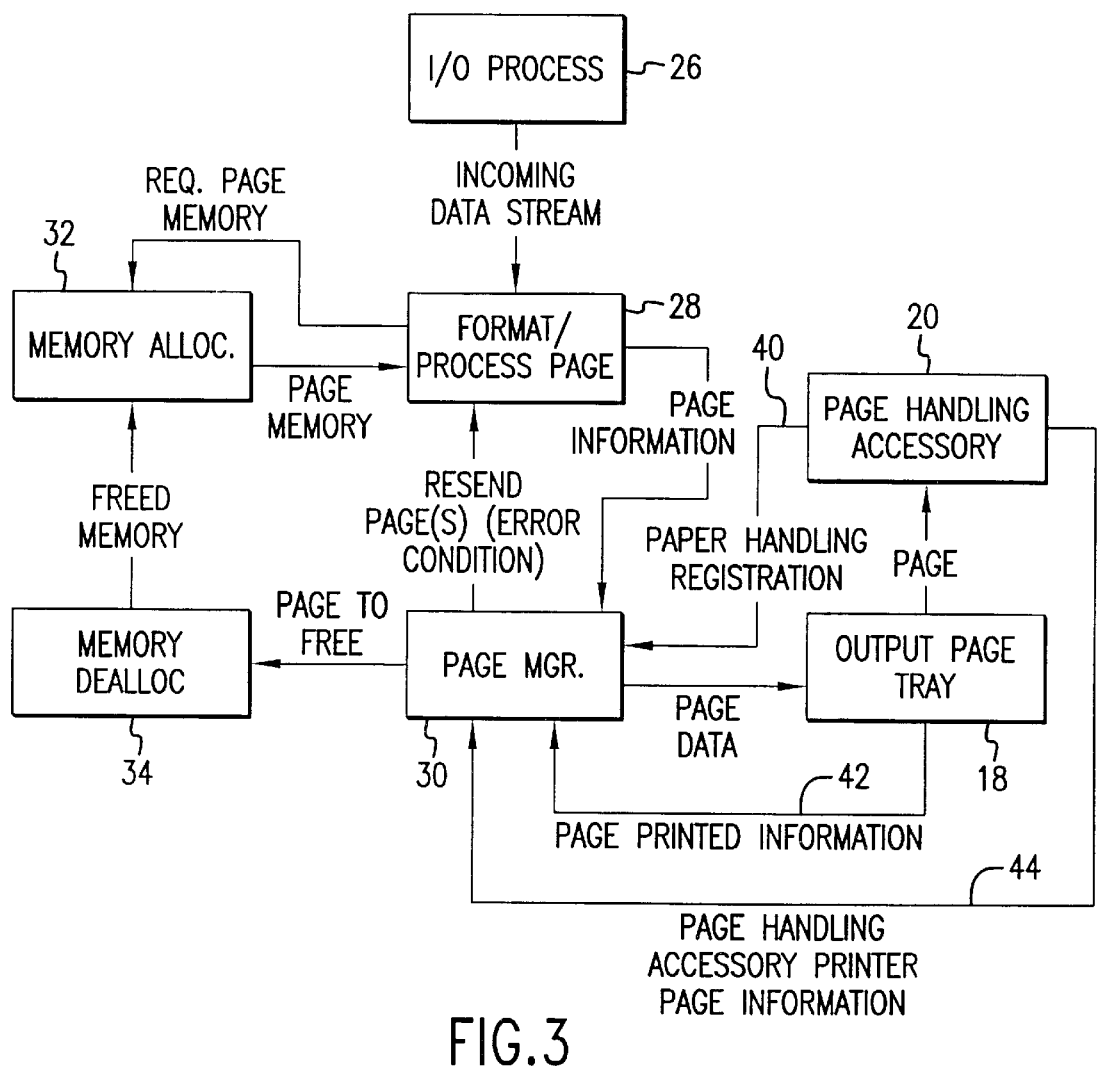
FIG. 3 is a process flow diagram illustrating the method of the invention.

Turning now to FIG. 3, the process followed by the invention will be described when paper handling accessory 20 is coupled to output paper tray 18 and to bus 22. Each of the elements in FIG. 3 that appears in FIG. 2 is numbered identically. The operation of printer 10, as illustrated in FIG. 3 is very similar to that shown in FIG. 2 except that page handling accessory 20, upon power up or other initiation of operation, registers its presence with page manager process 30 via signal line 40. Such registration notifies page manager process 30 of the presence of page handling accessory 20 and causes a change in the condition which enables it to signal memory deallocation process 34 to release a previously allocated area of memory.

More particularly, page manager process 30 conditions such a release upon receiving both a page ejection signal via line 42 from output paper tray 18 and a page ejection signal via line 44 from page handling accessory 20. Only upon the receipt of both signals does page manager process 30 issue a signal to memory deallocation procedure 34 to deallocate previously allocated memory for the respective ejected page. It is to be understood that plural page handling accessories may be coupled, in "series", to the output page tray. In such case, it is the page ejection signal from the last accessory in the series that is the signal that controls the page memory deallocation.

If a malfunction occurs at page handling accessory 20, notification thereof is sent via line 44, causing page manager process 30 to dispatch pages from the last known successful page that was output by page handling accessory 20. Accordingly, page jams or errors that occur between output page tray 18 and paper handling accessory 20 are sensed so as to enable page manager process 30 to recover and to assure that page data is retained in memory until all of the pages are successfully output by page handling accessory 20.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for assuring that page data in an imaging device's memory is retained until a page with said page data is successfully output to an attached page handling accessory, said system comprising:

a memory including a storage area allocated to store said page data to be printed;

a print engine responsive to said page data to output a printed page;

an output tray for receiving said printed page from said print engine and for providing a first signal indicative of such receipt of said page;

a page handling accessory coupled to said output tray for further processing said printed page, and for providing a second signal indicative of a page output therefrom after said processing; and a processor controlled by a page manager process, said processor controlled to deallocate memory that is allocated to a page upon receipt of both said first signal and said second signal, said second signal indicating that said page has exited said page handling accessory.

2. The system as recited in claim 1, wherein, upon an initiation of operation, said page handling accessory registers its presence with said page manager process, said page manager process responsive to said registration to not deallocate memory until both said first signal and said second signal are received.

3. The system as recited in claim 2, wherein said page manager process in absence of said registration of said presence of said page handling accessory, acts to deallocate memory previously allocated to said page, when said first signal is received.

4. The system as recited in claim 1, wherein said imaging device is a printer.

5. The system as recited in claim 1, wherein the page handling accessory is coupled to said output tray via at least one other accessory and is the ultimate page output device for the system.

6. A memory device for holding coded procedures to assure that page data in an imaging device's memory is retained until a page with said page data is successfully output to an attached page handling accessory, said imaging device including a processor, a memory with a storage area allocated to store said page data to be printed, a print engine responsive to said page data to output a printed page, an output tray for receiving said printed page from said print engine and for providing a first signal indicative of such receipt of said page and a page handling accessory for receiving pages from said output tray, either directly or from an intervening accessory, for further processing said printed page, and for providing a second signal indicative of a page output therefrom after said processing, said memory media comprising:

a) means for controlling said processor to recognize a presence of said page handling accessory; and b) means for controlling said processor to deallocate memory that is allocated to a page upon receipt of both said first signal and said second signal, said second signal indicating that said page has exited said page handling accessory.

7. The memory media as recited in claim 6, wherein said means a) recognizes said presence of said page handling accessory when said page handling accessory registers its presence, said means b) responsive to said registration to control said processor to not deallocate memory until both said first signal and said second signal are received.

8. The memory media as recited in claim 7, wherein said means b), in absence of said registration of said presence of said page handling accessory, controls said processor to deallocate memory previously allocated to said page, when said first signal is received.

* * * * *